United States Patent [19]
Faris et al.

[11] 3,765,313
[45] Oct. 16, 1973

[54] VIEW FINDER

[75] Inventors: Edwin E. Faris, Wyckoff; Richard Kopala, Rochelle Park, both of N.J.

[73] Assignee: Berkey Photo, Inc., Paramus, N.J.

[22] Filed: July 3, 1972

[21] Appl. No.: 268,574

[52] U.S. Cl. ............ 95/11 V, 95/31 CA, 95/31 DS
[51] Int. Cl. ......................................... G03b 19/00
[58] Field of Search .................... 95/31 DS, 31 CA, 95/11 V, 96

[56] References Cited
UNITED STATES PATENTS

| | | | |
|---|---|---|---|
| 2,522,387 | 9/1950 | Livens | 95/31 DS |
| 2,233,239 | 2/1941 | Baumgartner | 95/31 DS |
| 2,247,104 | 6/1941 | Takacs | 95/31 DS |
| 3,678,827 | 7/1972 | Eagle | 95/31 CA X |

FOREIGN PATENTS OR APPLICATIONS

| | | | |
|---|---|---|---|
| 1,280,050 | 10/1968 | Germany | 95/11 V |
| 847,990 | 9/1960 | Great Britain | 95/31 DS |

Primary Examiner—Samuel S. Matthews
Assistant Examiner—E. M. Bero
Attorney—Albert H. Pendleton et al.

[57] ABSTRACT

A view finder is provided for a camera wherein the latter is adapted to accommodate film cartridges or packets of two different sizes. The viewfinder is carried on the camera and is adapted to automatically vary by means of an adjustably mounted masking piece the size of the viewing area to be observed through the viewfinder so as to coordinate same with the size film being used in the camera. The adjustment of the masking piece is effected during loading of a given size film cartridge into the camera. Thus, the viewfinder facilitates proper manual aligning of the camera lens with the subject being photographed.

9 Claims, 6 Drawing Figures

PATENTED OCT 16 1973  3,765,313

VIEW FINDER

BACKGROUND OF THE INVENTION

In cameras capable of accommodating different size film, it is oftentimes difficult for an inexperienced operator to adjust the camera relative to the subject being photographed so that the latter will be properly located on the photograph which will be ultimately produced from the particular film being used. Even with an experienced operator, considerable time and adjustment are required to properly compensate for the variation in film size.

SUMMARY OF THE INVENTION

Thus, it is an object of the invention to provide a viewfinder which will automatically compensate for the various size film being used in the camera; and, thus, greatly reduce the incidents of inferior photographs being taken with the camera.

It is a further object of the invention to provide a viewfinder which is of simple, compact construction and does not require one of exceptional talent or expertise to correctly utilize said device.

It is a still further object of the invention to provide a viewfinder which may be mounted directly on the camera housing and does not in any way interfere with the normal operation of the camera itself.

It is a still further object of the invention to provide a viewfinder which utilizes a minimal number of component parts and does not require frequent adjustment or servicing.

Further and additional objects will appear from the description, accompanying drawings and appended claims.

In accordance with one embodiment of the invention, a viewfinder is provided for use on a camera which is adapted to accommodate film packets or cartridges of two different sizes. The camera is provided with an opaque housing having a focusing lens mounted on the front end thereof, and a cartridge holder mounted within the housing and disposed rearwardly of the lens. The area of exposure of the film contained within the smaller cartridge is less than the area of exposure of the film contained in the larger cartridge; and, thus, the viewfinder is adapted to automatically compensate for this area variation. The viewfinder includes a tubular member or casing which is mounted on the camera housing. Disposed within the casing, and in axially spaced relation with respect to one another are first and second lenses. Adjustably mounted within the casing and disposed intermediate the lenses is a masking piece. When the masking piece is in one position of adjustment, a portion of the viewing are of one of the lenses is blocked out. When the masking piece is in a second position of adjustment, the viewing area of both lenses is not obstructed by the masking piece. The masking piece is biased to assume one of the positions of adjustment. Adjustably connected to the masking piece is an actuating element. A portion of the actuating element is disposed adjacent the film cartridge holder and is adapted to be engaged only by one size cartridge when the latter is disposed within said holder; and, thus, overcome the bias exerted on the masking piece and move the latter to the other position of adjustment.

DESCRIPTION

For a more complete understanding of the invention reference should be made to the drawings wherein.

Figure 1:
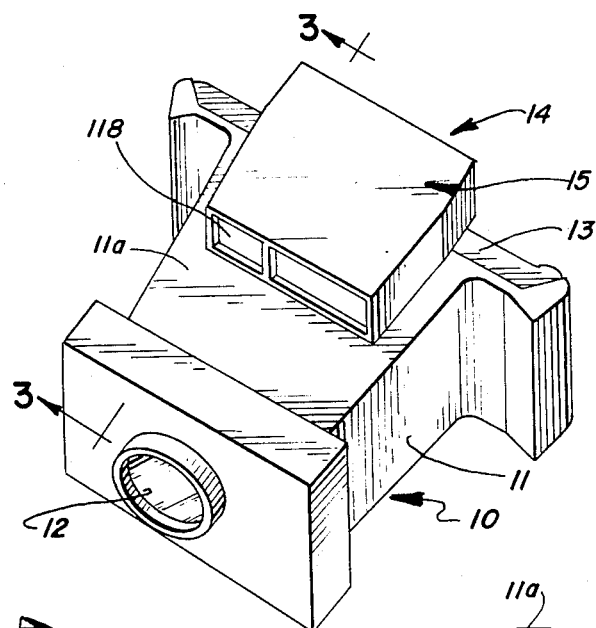
FIG. 1 is a perspective, top, front view of one form of the improved viewfinder shown mounted on the exterior of a camera housing.

Referring now to the drawings and more particularly to FIG. 1, a camera 10 is shown which is adapted for use with cartridges $C_1$ and $C_2$ of film wherein the size of the negatives and/or the picture produced by said film may vary to a substantial extent. For example, cartridges of self-developing film, which are presently available on the retail market come in two sizes, one of which produces substantially square pictures measuring approximately 3×3 inches and the other size producing rectangular pictures measuring approximately 3×3-¾ inches. Because of the size differential of the two pictures, it is important to compensate for this fact when photographing a particular subject so that a quality picture will be produced with the subject thereof properly centered in the picture regardless of which size film is being used.

The cartridges containing the various size film are disposable and have different exterior dimensions; for example, the cartridge $C_1$ for the small size film measures approximately 3-½ × ¾ × 4-7/16 inches, whereas the cartridge $C_2$ for the large size film measures approximately 3-½ × ¾ × 5-¼ inches. The importance of the variation in the length dimensions of the two cartridges will be discussed more fully hereinafter.

Basically, camera 10, as seen in FIG. 1, includes a housing 11 formed of opaque material; a lens 12 mounted on the front end of the housing; shutter means, not shown, for controlling the light rays passing through the lens; a cover 13 adjustably mounted on the back side of the housing to permit loading and unloading of the camera; and the viewfinder 14 mounted on the top panel 11a of the housing.

The illustrated embodiment of the viewfinder 14 includes a casing 15 of opaque material which may be molded or otherwise secured to the exterior of the camera housing 11. The casing 15 is positioned adjacent the rear portion of the housing 11 and has mounted therein an eyepiece 16, a first lens 17 and a second lens 18. The eyepiece and the two lenses 17 and 18 are arranged in axially spaced relation. The axis of said eyepiece and lenses is substantially parallel to the optical axis of the lens 12 mounted on the front end of the housing 11.

Figure 2:
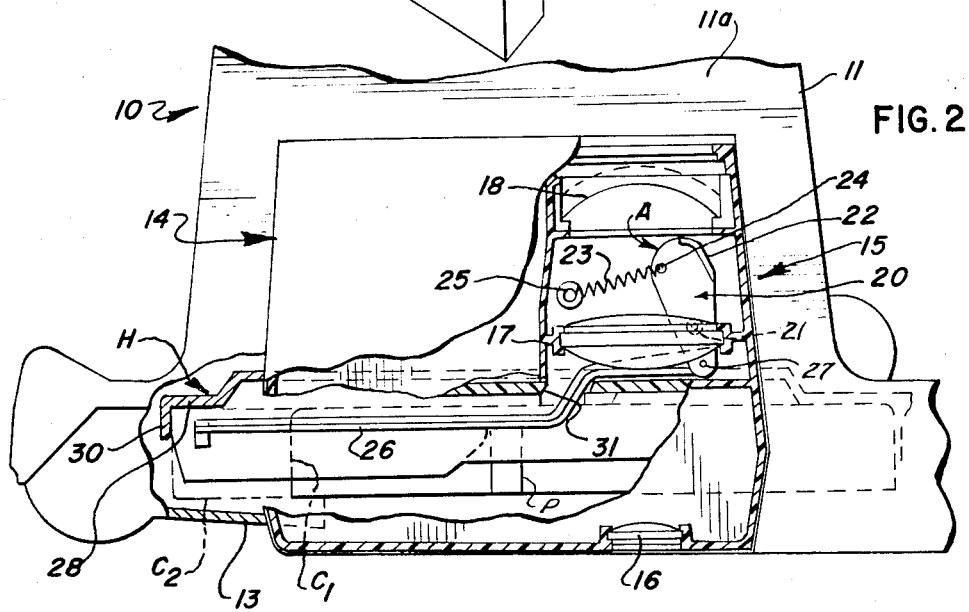
FIG. 2 is an enlarged, fragmentary, top view of the viewfinder of FIG. 1 with portions thereof removed to expose various components disposed within the viewfinder casing and the rear of the camera housing and showing a small size film cartridge loaded in the holder disposed adjacent the rear of the camera housing; a larger film cartridge is shown in phantom lines accommodated in said holder.
Figure 3:
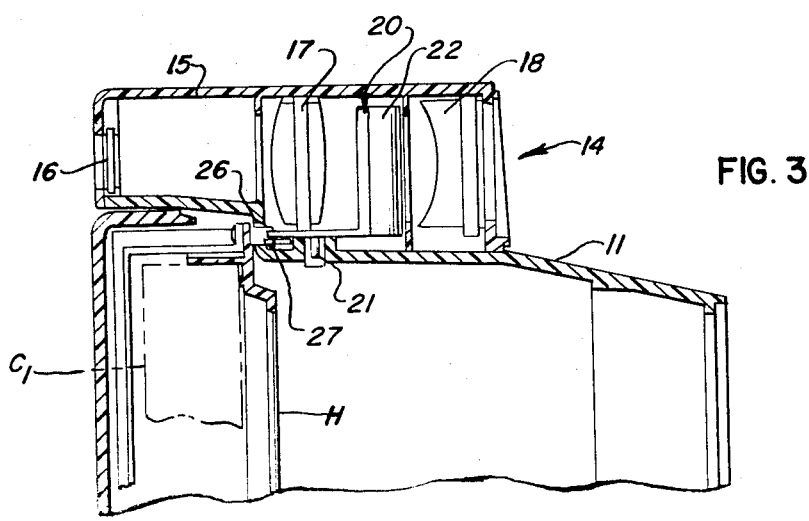
FIG. 3 is an enlarged, fragmentary, sectional view taken along line 3—3 of FIG. 1.
Figure 5:
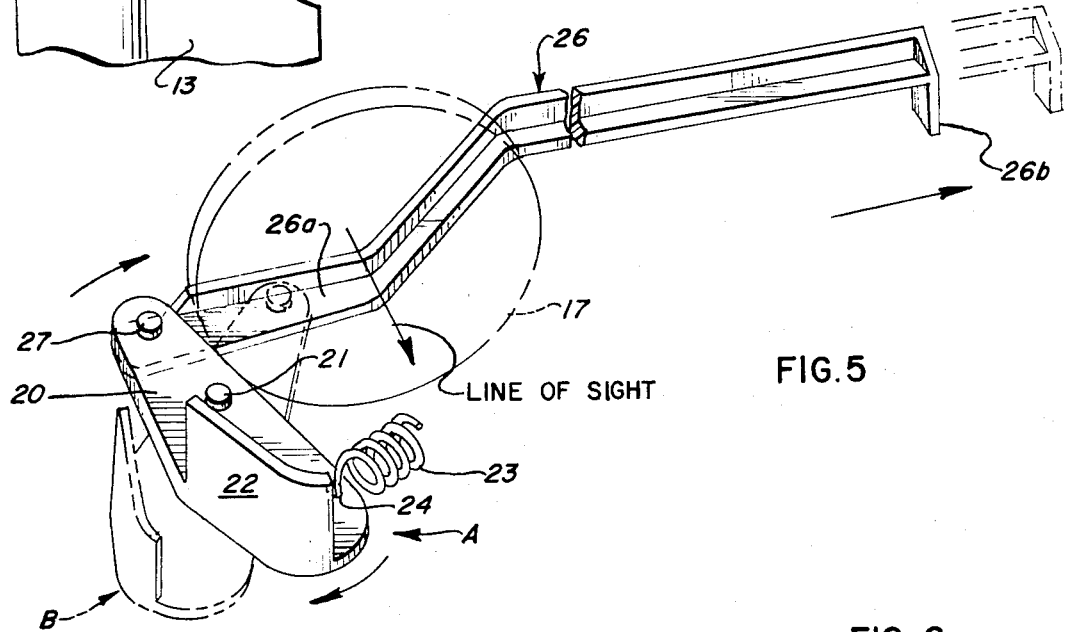
FIG. 5 is an enlarged, fragmentary perspective, schematic view of certain of the components of the viewfinder of FIG. 2 with the masking piece and actuating element shown in phantom lines in a changed position.

Also disposed within casing 15 and positioned intermediate lenses 17 and 18 is an adjustable masking piece 20. As seen in FIGS. 2 and 5, the masking piece 20 is mounted so as to pivot about a fixed pin 21 which is disposed intermediate the ends of the piece. The forward end of piece 20, that is the end closest to lens 18, is provided with an upstanding slightly curved flange 22. The flange 22 serves to mask out a portion of the viewing area of the lens 18 when the piece 20 is in one position A of pivotal adjustment, see FIGS. 2 and 5. Thus, when the piece 20 is in position A, the viewing area seen through the viewfinder 10 will be reduced and conform substantially to the area of the small size picture which will result from exposure of a portion of the film contained within the cartridge $C_1$, when the latter is loaded into the camera. With the masking piece 20 in position A, the person utilizing the camera loaded with the small film can readily observe through the viewfinder how the subject will eventually appear in the picture before the latter is taken.

When the masking piece 20 is in position B, as seen in FIG. 5, the upstanding flange does not obstruct the viewing area as seen through the viewfinder and thus, the viewing area will conform substantially to the area of the larger size picture resulting when the larger film cartridge $C_2$ is loaded in the camera.

In the form of viewfinder 14, shown in FIGS. 2 and 5, the masking piece 20 is biased by a coil spring 23 to assume position A. One end of spring 23 is inserted through an opening 24 formed in the forward end of piece 20. The other end of the spring is connected to a fixed pin 25, disposed within the casing 15.

Figure 4:
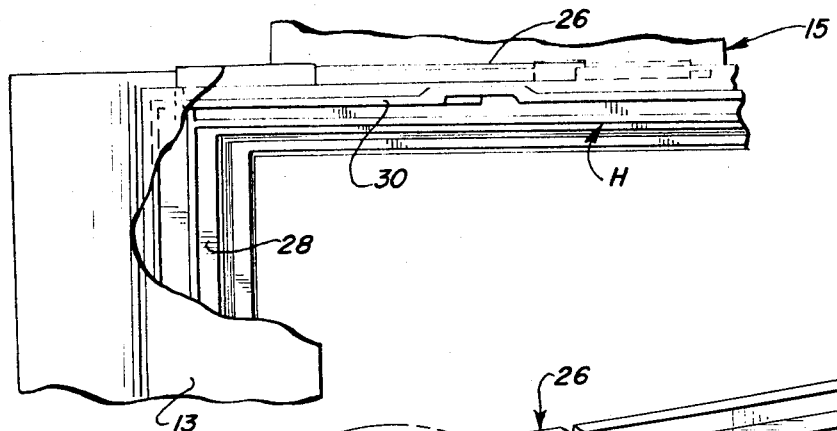
FIG. 4 is an enlarged, fragmentary rear view of the camera of FIG. 1 with a portion of the camera housing removed and exposing the film cartridge holder disposed therein and the actuating element of the viewfinder shown in FIG. 2.

An elongated lever 26 is provided, see FIGS. 2, 4 and 5, to effect movement of piece 20 from position A to position B. One end 26a of the lever is connected by pin 27 to the rear end of piece 20. The opposite end 26b of the lever is offset and is adapted to be engaged by one end of the larger size cartridge $C_2$, when the latter is loaded into the camera.

When either cartridge $C_1$ or $C_2$ is loaded into the rear end of the camera, it is accommodated within a rectangular holder H, see FIGS. 2 and 4, which is fixedly secured to the interior of the camera housing 11. One type of holder adapted to be used for this purpose is disclosed in pending U.S. Pat. application Ser. No. 268,573 filed concurrently herewith on July 3, 1972 by Edwin E. Faris and Charles J. Hertling, and entitled CAMERA CONSTRUCTION. Briefly, the holder H is provided with an apertured base portion 28 against which the front face of the cartridge rests, and a plurality of side flanges 30 which extend rearwardly from the base portion and cooperate with one another to delimit a rectangular area which is capable of receiving either size cartridge $C_1$ or $C_2$. The lever 26 overlies the upper side flange of the holder and is adapted to slide endwise in one direction relative to the holder, when the offset end 26b of the lever 26 is engaged by the cartridge $C_2$, upon the latter being inserted into the holder H and to move endwise in the opposite direction when cartridge $C_2$ is removed from the holder. The latter endwise movement of the lever 26 is caused by the bias exerted by the spring 23 on the masking piece 20. A suitable slot 31 is provided in the viewfinder casing 15 and the holder H to permit endwise movement of the lever.

Figure 6:
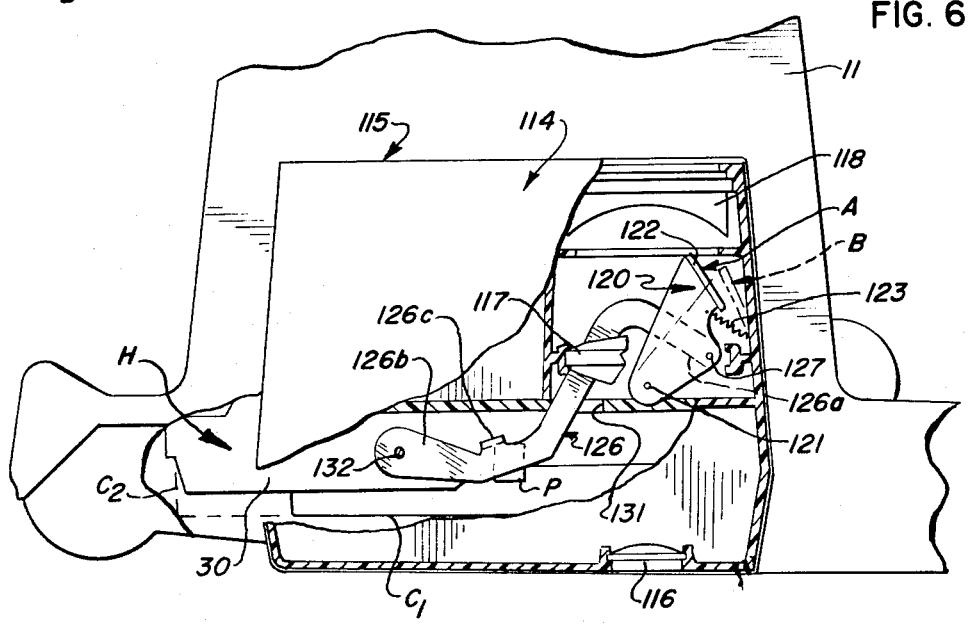
FIG. 6 is similar to FIG. 2 but showing the masking piece and actuating element of a modified form of the improved viewfinder.

A modified viewfinder 114 is shown in FIG. 6. Because of the fact that many of the components comprising viewfinder 114 are similar to those of viewfinder 14, such components are similarly numbered except in a one hundred series. The basic structural difference between the two viewfinders is that in viewfinder 114, the masking piece 120 is biased by spring 123 to normally assume position B wherein the viewing area through the viewfinder is not obstructed by the upstanding flange 122 formed on the front end of the masking piece as in the case of piece 20 shown in FIG. 5. As seen in FIG. 6, the masking piece is mounted for pivotal movement about a fixed pin 121 which is disposed adjacent the rear end of the piece. An actuating lever 126 is provided for effecting movement of the masking piece 120 from position B to position A. One end 126a of the lever 126 is connected by a pin 127 to the masking piece 120. The opposite end 126b of the lever is pivotally connected at 132 to a portion of the flange 30 comprising the holder H. Intermediate the ends of lever 126 is a pad-like element 126c which is adapted to be engaged by only a protuberance P formed on the exterior of the small size cartridge $C_1$ when the latter is loaded into the holder H. Cartridge $C_2$ cannot engage the element 126c because said cartridge is not provided with a corresponding exterior protuberance.

As in the case of the lever 26 of viewfinder 14, lever 126 is mounted so that it subtends lens 117. Portions of the masking piece 120 also extend beneath the lens 117 and thus movement of the lever and masking piece are not obstructed by the lens.

Thus, with either type of viewfinder 14 or 114, the viewing area through the casing will be automatically varied to compensate for the particular size film being used in the camera. No adapter or other separate device is required to be manually mounted on or removed from the camera when a different size film is being used. The improved viewfinder is of simple and compact construction and does not interfere with or vary the mode of operation of the camera.

The location, size and configuration of the viewfinder may vary from that shown and will depend upon the camera on which it is mounted and the various size and types of film capable of being used with the camera.

We claim:

1. A viewfinder and camera wherein said camera comprises a housing of fixed dimension, a focusing lens mounted on the front end of said housing and a film cartridge holder mounted within said housing adjacent the rear end thereof, said holder being capable of accommodating film cartridges of different sizes; said viewfinder comprising an elongated casing mounted on said camera housing, said casing being provided with aligned front and rear openings; lens means disposed within said casing and aligned with said front and rear openings; a masking piece adjustably mounted within said casing and disposed adjacent said lens means, said masking piece including a transversely extending portion movable between a first position adjacent the focal axis of said lens means and a second position remote from said focal axis upon adjustment of said masking piece, said masking piece portion when disposed in said first position restricting the size of the viewing area to be observed through the rear opening, lens means, and front opening of the viewfinder, said masking piece normally assuming one of said positions; and actuating means connected to said masking piece and having a portion thereof disposed adjacent the cartridge holder of said camera, said portion of said actuating means being engaged only when one size film cartridge is disposed within said holder whereby said masking piece is actuated and the transversely extending portion thereof is moved from its normally assumed position to the other of said positions.

2. The viewfinder and camera of claim 1 wherein the axis of said front and rear openings of said casing is substantially parallel to the principal axis of the camera focusing lens, and said casing includes an eyepiece mounted within the rear opening of said casing; said eyepiece being axially aligned with said lens means and the front opening of said casing.

3. The viewfinder and camera of claim 1 wherein said masking piece portion normally assumes said first position.

4. The viewfinder and camera of claim 1 wherein said masking piece is mounted for pivotal movement about a fixed axis, and the transversely extending portion of said masking piece is an upright opaque flange spaced from said pivotal axis.

5. The viewfinder and camera of claim 4 wherein the pivotal axis of said masking piece is disposed intermediate the opaque flange and the connection between said actuating means and said masking piece.

6. The viewfinder and camera of claim 4 wherein said masking piece is provided with a spring having one end thereof connected to a portion of said masking piece intermediate said opaque flange and the pivotal axis of said masking piece, and the opposite end of said spring fixedly connected to the camera housing.

7. The viewfinder and camera of claim 4 wherein the connection between said masking piece and said actuating means is disposed intermediate the opaque flange and the pivotal axis of said masking piece.

8. The viewfinder and camera of claim 4 wherein said actuating means includes an elongated rod mounted for longitudinal movement and having one end thereof connected to said masking piece and the opposite end portion thereof being disposed within the camera housing and provided with abutting means disposed adjacent said cartridge holder for engagement by one size film cartridge when the latter is being loaded into said holder and effecting longitudinal movement of said rod in one direction and moving the opaque flange away from its normally assumed position with respect to the lens means axis.

9. The viewfinder and camera of claim 4 wherein said actuating means includes an elongated rod pivotally mounted within said camera housing and having one end of said rod connected to said masking piece, said rod having a pad-like portion spaced from the pivotal axis of said rod and disposed adjacent said holder and engaged by one size film cartridge, when the latter is loaded into the holder, and effecting movement of the masking piece flange away from its normally assumed position with respect to the lens means axis.

* * * * *